(12) United States Patent
Tottori

(10) Patent No.: US 8,302,718 B2
(45) Date of Patent: Nov. 6, 2012

(54) ENGINE ROOM COVER AND METHOD FOR MOUNTING THEREOF

(75) Inventor: Masaomi Tottori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 366 days.

(21) Appl. No.: 12/626,043

(22) Filed: Nov. 25, 2009

(65) Prior Publication Data

US 2010/0127534 A1 May 27, 2010

(30) Foreign Application Priority Data

Nov. 26, 2008 (JP) ................. 2008-300468
Oct. 6, 2009 (JP) ................. 2009-232384

(51) Int. Cl.
*B62D 25/10* (2006.01)

(52) U.S. Cl. ............... 180/69.24; 296/193.09

(58) Field of Classification Search ........... 180/69.2, 180/69.21, 69.22, 69.24; 296/193.09, 193.1, 296/193.11
See application file for complete search history.

(56) References Cited

U.S. PATENT DOCUMENTS

| | | | | |
|---|---|---|---|---|
| 3,583,513 A | * | 6/1971 | Macadam et al. | 180/69.24 |
| 3,688,856 A | * | 9/1972 | Boehm et al. | 180/190 |
| 6,655,486 B2 | * | 12/2003 | Oshikawa et al. | 180/68.1 |
| 7,523,798 B2 | * | 4/2009 | Muramatsu et al. | 180/68.1 |
| 7,611,192 B2 | * | 11/2009 | Takei | 296/187.04 |
| 7,837,256 B2 | * | 11/2010 | Takayanagi et al. | 296/203.02 |
| 2006/0151222 A1 | | 7/2006 | Tinti | |

FOREIGN PATENT DOCUMENTS

| | | |
|---|---|---|
| CN | 1755185 A | 4/2006 |
| JP | 3-47947 | 10/1991 |
| JP | 03-118835 | 12/1991 |
| JP | 3068533 | 2/2000 |
| JP | 2006-513925 | 4/2006 |

* cited by examiner

*Primary Examiner* — John Walters
(74) *Attorney, Agent, or Firm* — Rankin, Hill & Clark LLP

(57) ABSTRACT

An engine room cover and a method for mounting thereof in which the engine room cover can be mounted and removed easily. The engine room cover includes a first cover body and a second cover body. The first cover body is installed in an engine room formed in a vehicle body and fixed to the vehicle body with a fastening member. The second cover body is removably attached to the first cover body and covers a maintained member installed in the engine room. The first cover body has a mounting hole bored in a direction of board thickness and an elastic bush fitted along an opening lip of the mounting hole. The second cover body has a boss portion inserted into the elastic bush.

24 Claims, 10 Drawing Sheets

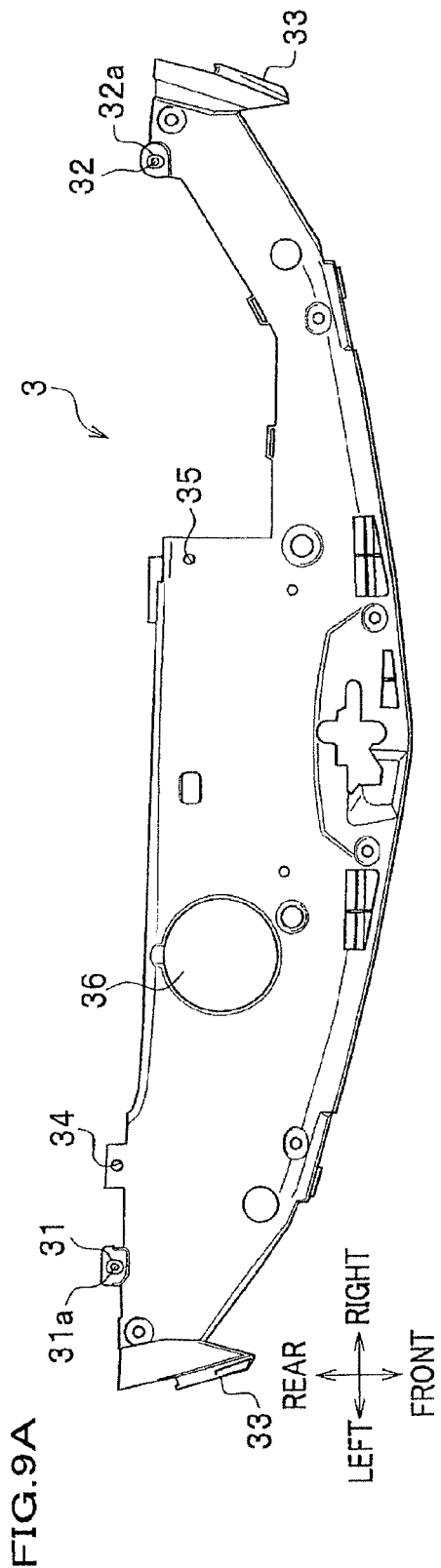
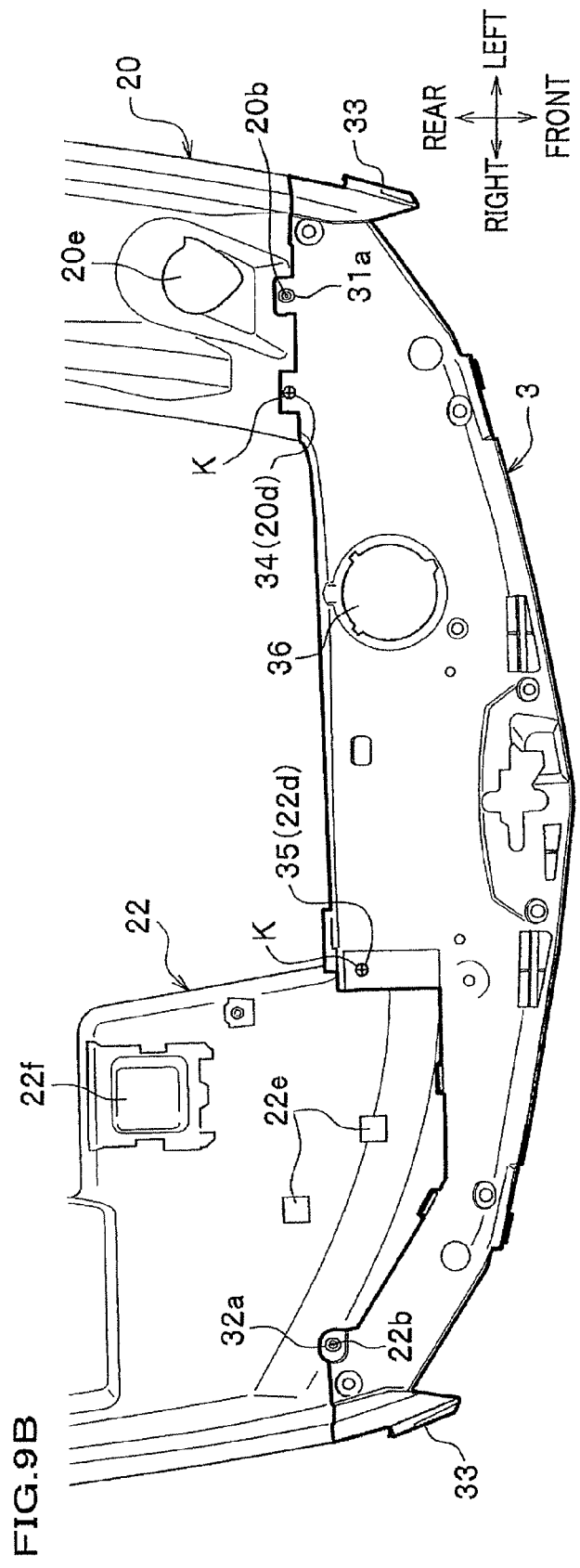

ENGINE ROOM COVER AND METHOD FOR MOUNTING THEREOF

CROSS REFERENCE TO RELATED APPLICATIONS

The present application claims benefit of the filing date of Japanese Patent Application No. 2008-300468 filed on Nov. 26, 2008 which is incorporated herein by reference.

FIELD OF THE INVENTION

The present invention relates to an engine room cover installed in an engine room, and to a method for mounting the engine room cover.

DESCRIPTION OF THE RELATED ART

A prior art engine room cover including: a heat and noise insulating board which extends from an inner wall for compartmentalizing and forming an engine room to an outer circumferential portion of an engine so as to separate the engine room in an up and down direction; and a space formed by concaving the heat and noise insulating board downwardly so as to install parts such as a battery and an air cleaner, etc. is disclosed in JP 03-047947 Y2.

Also, in the prior art, an engine room cover, which is provided so that the engine room cover covers parts such as the battery and the air cleaner, etc. installed in an engine room of a vehicle from above in order to improve an appearance of the engine room and to insulate or suppress noise from the engine, is well known.

By the way, because the battery, etc. is a consumable part, maintenance needs to be performed periodically. If the engine room cover is provided, maintenance of the battery, etc. needs to be performed after the engine room cover is removed. However, because the engine room cover disclosed in JP 03-047947 Y2 is firmly attached to a vehicle body with screws, there arises a problem that it becomes complicated to remove the engine room cover from the vehicle body.

Therefore, in order to overcome the above problem, a method has been proposed in which mounting holes are formed on the vehicle body, elastic bushes are fitted along opening lips of the mounting holes, and boss portions are provided on the engine room cover so as to attach the engine room cover to the vehicle body by inserting these boss portions into the elastic bushes.

However, according to the above method, there arises a problem that a working efficiency of elastic bush fitting operation decreases Owing to obstructions such as engine peripheral parts and an engine hood, etc. installed on a vehicle body side when the elastic bush is fitted into the mounting hole formed on the vehicle body.

In view of the above situation, the present invention has been invented. Therefore, an object of the present invention is to provide an engine room cover and a method for mounting thereof in which the engine room cover can be mounted and removed easily so as to perform maintenance easily and to increase the working efficiency of elastic bush fitting operation.

SUMMARY OF THE INVENTION

In order to achieve the above object, the present invention provides an engine room cover including: a first cover body installed in an engine room formed in a vehicle body, and fixed to the vehicle body with a fastening member; and a second cover body removably attached to the first cover body and covering a maintained member installed in the engine room, in which the first cover body has a mounting hole bored in a direction of board thickness and an elastic bush fitted along an opening lip of the mounting hole, and the second cover body has a boss portion inserted into the elastic bush.

According to the present invention, by providing the mounting hole and the elastic bush fitted along the opening lip of the mounting hole on the first cover body, and providing the boss portion inserted in the elastic bush on the second cover body, maintenance of a maintained member (e.g., battery, etc.) can be performed easily because a mounting/removing operation of the second cover body to/from the first cover body becomes easy.

Also, by providing the elastic bush on the first cover body, if the elastic bush is provided on the first cover body before the first cover body is attached to the vehicle body, the working efficiency of elastic bush fitting operation increases because the engine peripheral parts and the engine hood, etc. do not obstruct fitting operation of the elastic bush.

That is, according to the present invention, both the maintainability and the elastic bush fitting workability can be improved.

Further, by fixing the first cover body to the vehicle body with the fastening member, a displacement of the first cover body relative to the vehicle body can be prevented because the first cover body is firmly fixed to the vehicle body.

Also, in order to achieve the above object, the present invention provides an engine room cover including: a resinous first cover body installed in an engine room formed in a vehicle body, and fixed to the vehicle body with a fastening member; and a second cover body removably attached to the first cover body and covering a maintained member installed in the engine room, in which the first cover body has a mounting hole bored in the direction of board thickness and whose opening lip is flexible, and the second cover body has a boss portion inserted into the mounting hole.

According to the present invention, by providing the mounting hole whose opening lip is flexible on the first cover body, and providing the boss portion inserted into the mounting hole on the second cover body, maintenance of a maintained member (e.g., battery, etc.) can be performed easily because a mounting/removing operation of the second cover body to/from the first cover body becomes easy.

Also, by providing the mounting hole whose opening lip is flexible on the first cover body instead of providing the elastic bush on the first cover body, a fitting operation of the elastic bush on the first cover body can be omitted.

Also, by forming the mounting hole whose opening lip is flexible, a number of parts can be reduced, and the mounting/removing, operation of the second cover body to/from the first cover body becomes easy because the elastic bush fitted along the opening lip of the mounting hole can be omitted. As a result, maintenance of the maintained member (e.g., battery, etc.) can be performed easily.

Further, by fixing the first cover body to the vehicle body with the fastening member, the displacement of the first cover body relative to the vehicle body can be prevented because the first cover body is firmly attached to the vehicle body.

Also, the mounting hole is preferably formed in the vicinity of a fastened portion between the first cover body and the vehicle body. In this manner, it becomes easy to insert the boss portion into the elastic hush, etc. and a working efficiency of attaching the second cover body to the first cover body increases because a stiffness of the first cover body with respect to an insertion load (mounting load) occurred at the time of inserting the boss portion of the second cover body into the elastic bush of the first cover body or the mounting hole whose opening lip is flexible increases, and flexure of the first cover body can be suppressed at the time of mounting the second cover body.

The first cover body has an overlapping portion with the second cover body and a non-overlapping portion with the second cover body, and insertion holes into which the fastening members are inserted are preferably formed on the non-overlapping portion with the second cover body. In this manner, a working efficiency of mounting the engine room cover to the vehicle body further increases because the engine room cover can be mounted to the vehicle body with the second cover body attached to the first cover body.

In the engine room, vehicle body panels extending in a front-rear direction on both sides of the vehicle, and a tower bar extending in a direction orthogonal to the vehicle body panel so as to span between the vehicle body panels are preferably provided. It is preferable that an upper surface of the tower bar is disposed above an upper surface of the vehicle body panel, and that the first cover body is attached to the tower bar so that an upper surface of the first cover body is coplanar (or approximately coplanar) with the upper surface of the tower bar. In this manner, the appearance of the engine room at the time of mounting the engine room cover can be further improved because continuity between the first cover body and the tower bar can be kept. Also, if the first cover body is attached to the vehicle body panel while keeping the continuity between the first cover body and the tower bar, a concave portion needs to be formed on the first cover body so as to compensate for a height difference between the first cover body and the vehicle body panel. However, if the first cover body is directly attached to the tower bar, the concave portion does not need to be formed. Therefore, a configuration of the first cover body can be simplified, and a working efficiency of attaching the first cover body to the vehicle body increases.

It is desirable that a front grille is installed ahead of the engine room, and that the first cover body includes a front grille cover disposed adjacent to the front grille ahead of the engine installed in the engine room. In this manner, an appearance can be improved because a gap in a parting line formed at a boundary portion between the front grille and the front grille cover, which gap is easy to be observed from front of the vehicle, disappears when the openable engine hood which covers the engine room is opened.

It is desirable to dispose the second cover body at a side portion of the engine in a vehicle width direction. In this manner, a certain gap in the parting line can be allowed because the side portion of the engine in the vehicle width direction is not easy to be observed from front of the vehicle when the engine hood is opened.

It is desirable that the engine is a transversal engine. In this manner, the maintainability of engine auxiliaries and transmissions, etc. can be improved because the maintenance of the engine auxiliaries and the transmission, etc. installed on the side of the engine in the vehicle width direction can be easily performed by only removing the second cover body from the first cover body.

Also, the present invention relates to a method for mounting an engine room cover to a vehicle body, including the steps of: connecting a first cover to a second cover integrally; and mounting the integrally connected first and second covers to the vehicle body.

According to the present invention, the engine room cover can be mounted in the engine room easily in a short time because the integrally connected first and second covers is mounted to the vehicle body after the first cover is connected to the second cover integrally.

Further, the present invention relates to a method for mounting an engine room cover to a vehicle body, including the steps of: connecting a first cover to a second cover integrally; connecting the integrally connected first and second covers to a front grille cover; and mounting the integrally connected first cover, second cover, and front grille cover to the vehicle body.

According to the present invention, the engine room cover can be mounted in the engine room easily in a short time in one working operation because the integrally connected first cover, second cover, and front grille cover is mounted to the vehicle body after the first cover, the front grille cover, and the second cover are connected integrally. Therefore, the engine room cover mounting workability is improved.

BRIEF DESCRIPTION OF THE DRAWINGS

The object and features of the present invention will become more readily apparent from the following detailed description taken in conjunction with the accompanying drawings in which:

FIG. 9A is a plan view showing a structure of a front grille cover according to this embodiment;

FIG. 9B is a bottom view showing a connection status between the front grille cover and the second cover according to this embodiment;

DETAILED DESCRIPTION OF THE INVENTION

Figure 1:
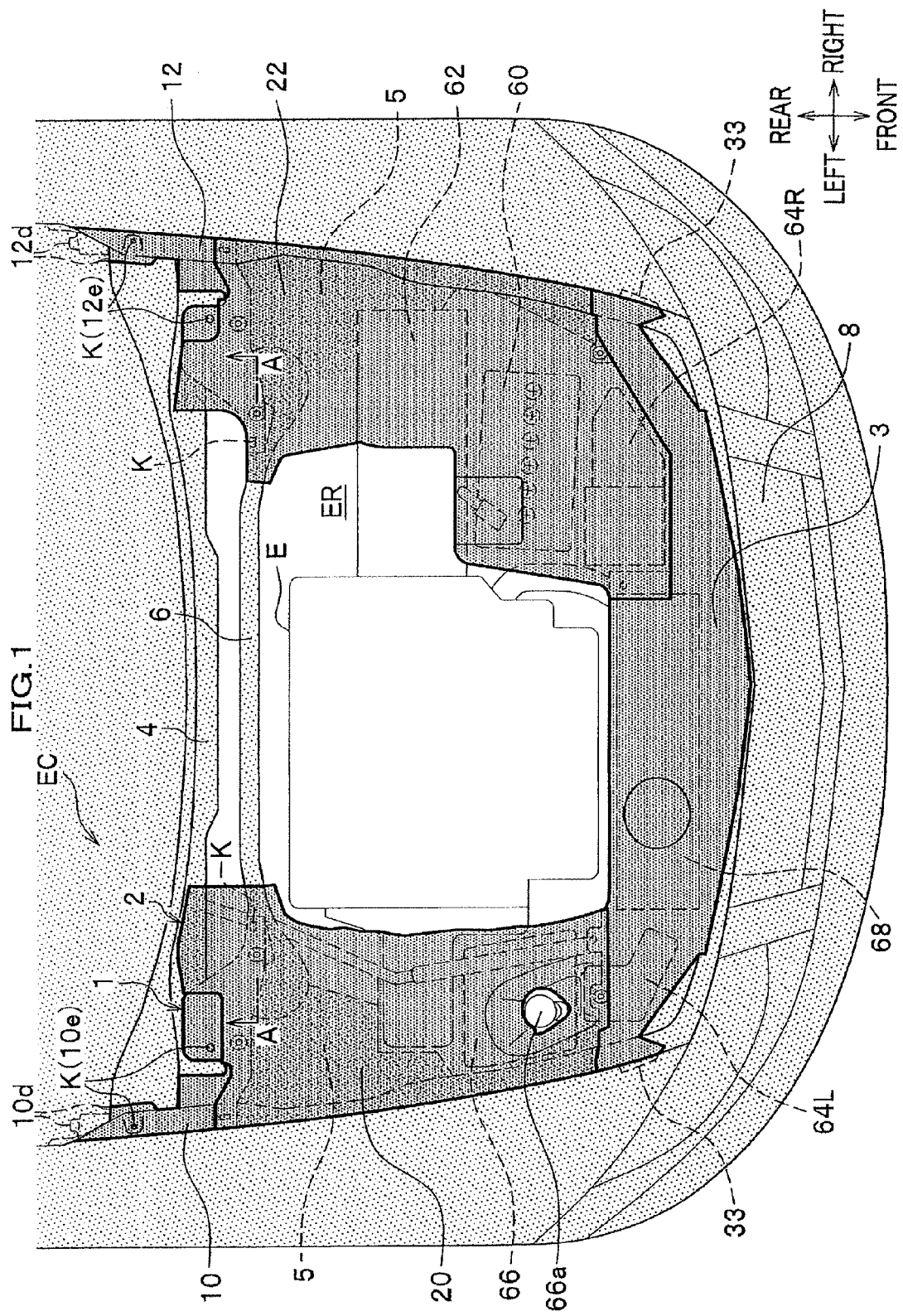
FIG. 1 is a plan view showing an installation status of an engine room cover according to an embodiment of the present invention.

Next, referring to FIGS. 1-12, embodiments according to the present invention will be explained. In explanations, similar reference numerals are used to denote similar components, and thus a duplicate description is omitted. In addition, hereafter, front and rear, up and down, and right and left are based on those of the vehicle.

Figure 2:
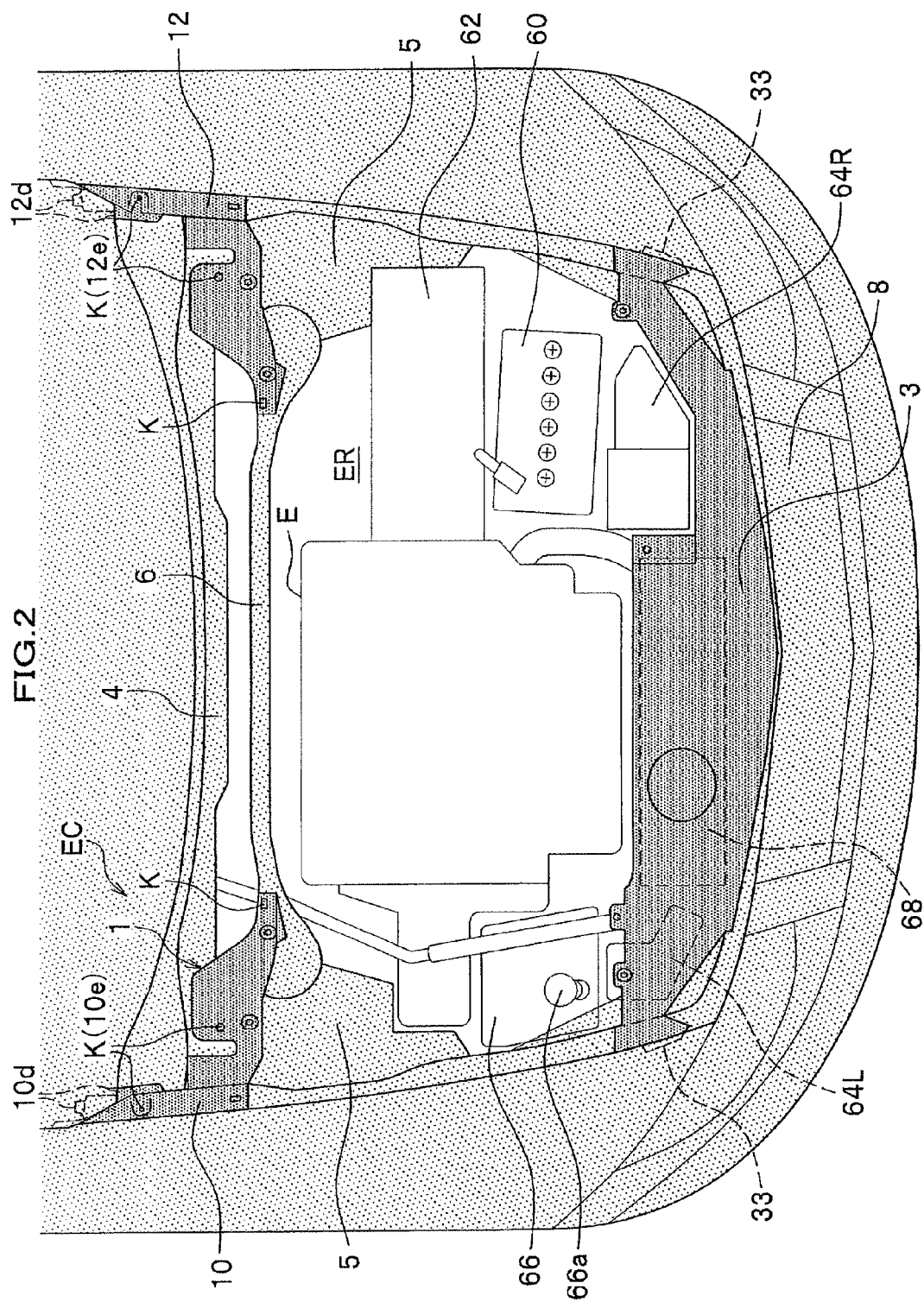
FIG. 2 is a plan view showing an engine room cover according to an embodiment of the present invention, with a second cover removed.

FIG. 1 is a plan view showing an installation status of an engine room cover according to an embodiment of the present invention, and FIG. 2 is a plan view showing an engine room cover according to the embodiment of the present invention, with a second cover removed.

As shown in FIG. 1, the engine room cover EC according to the embodiment is installed in an engine room ER so as to enclose an engine E, and to cover maintained members such as a battery 60, an air cleaner 62, a light unit 64R (64L), a washer tank 66, and a radiator 68, etc. from above. In addition, "maintained member" means a member which needs to be maintained, and is not limited to members listed in this embodiment. Also, the engine E of this embodiment is a transversal engine, and engine auxiliaries (e.g., an alternator, a starter, a water pump, and an oil pump, etc.) and transmissions (e.g., a transmission oil cooler and an oil filter installed on an upper surface of the transmission, etc.) are installed at a side portion of the engine E in a vehicle width direction. The engine auxiliaries and transmission, etc. are also included in the maintained members.

The engine room cover EC is mainly constructed from a first cover 1 and a front grille cover 3 (i.e., a first cover body), and a second cover 2 (i.e., a second cover body).

Figure 3:
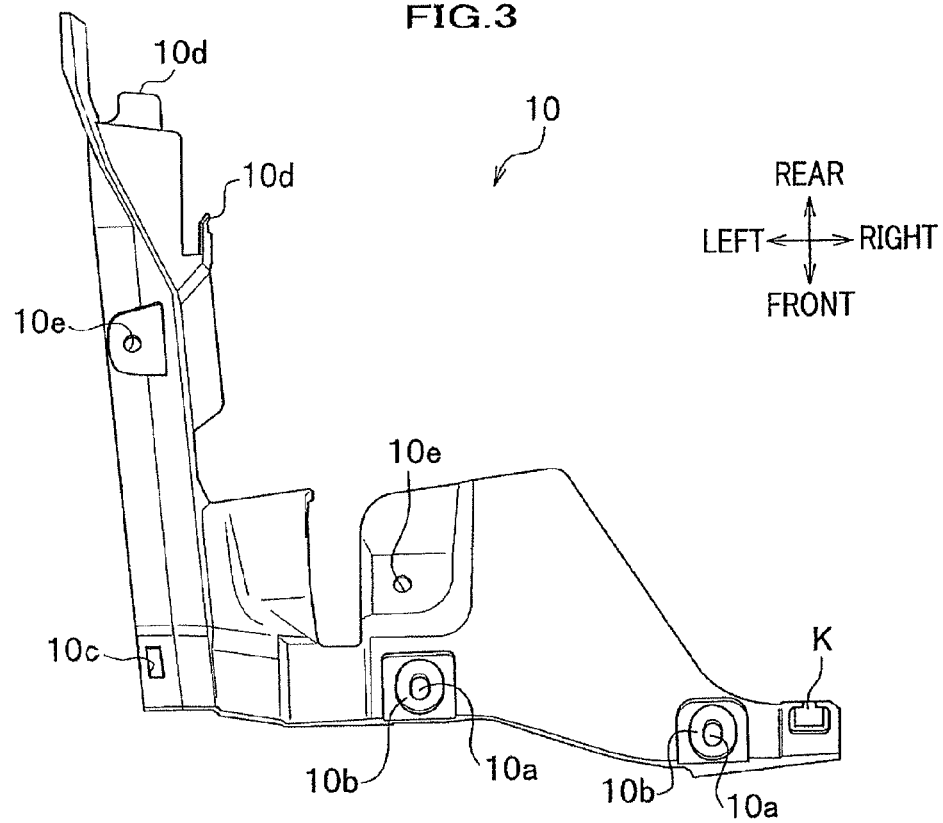
FIG. 3 is a plan view showing a structure of a first left cover according to this embodiment.
Figure 4:
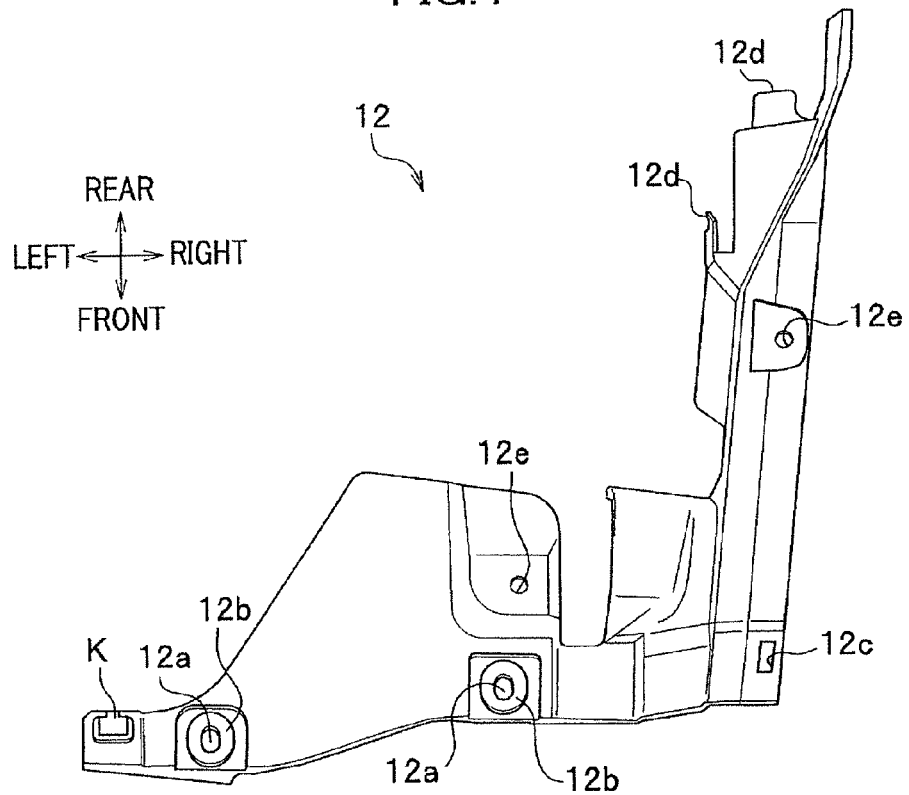
FIG. 4 is a plan view showing a structure of a first right cover according to this embodiment.

Referring to FIGS. 3 and 4, the first cover 1 which is one of the first cover bodies will be explained in detail. In addition, FIG. 3 is a plan view showing a structure of a first left cover according to this embodiment, and FIG. 4 is a plan view showing a structure of a first right cover according to this embodiment.

As shown in FIGS. 1 and 2, the first cover 1 is disposed to cover a part of a backside of the engine room ER. The first cover 1 includes a pair of left and right cover bodies, and is mainly constructed from a first left cover 10 and a first right cover 12.

In addition, hereafter, an explanation for the first left cover 10 will be described and an explanation for the first right cover 12 will be omitted because the first left cover 10 and the first right cover 12 are approximately symmetrical each other.

As shown in FIG. 3, a plurality (e.g., two) of mounting holes 10a, 10a are bored in the direction of board thickness at a front end side of the first left cover 10 (i.e., at the side of the second left cover 20), and elastic bushes 10b, 10b are fitted along opening lips of the mounting holes 10a, 10a.

Also, an engaging hole 10c is bored in the direction of board thickness at the front end side of the first left cover 10. At a rear end side of the first left cover 10, a plurality (e.g., two) of inserts 10d, 10d projecting posteriorly are formed.

Figure 7B:
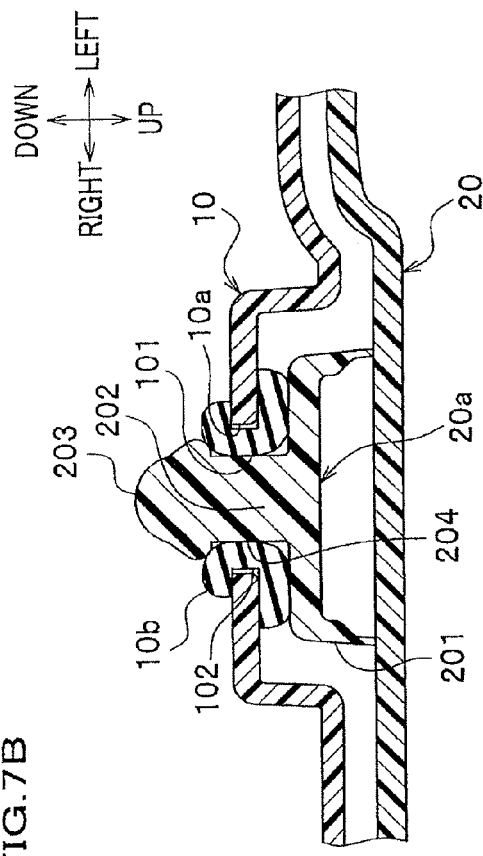
FIG. 7B is a sectional view taken along the line B-B of FIG. 7A.

As shown in FIG. 7B, a hole 101 and a ring-shaped groove portion 102 are formed at the center of the elastic bush 10b in the direction of board thickness. A lip of the mounting hole 10a is fitted into the groove portion 102.

As shown in FIGS. 1 and 2, a clip K to connect the first left cover 10 to a tower bar 6 which constitutes a part of the vehicle body is provided at an appropriate place of the first left cover 10, and a plurality (e.g., two) of insertion holes 10e, 10e are formed at positions corresponding to mounting holes (not shown) of a vehicle body panel 5 which constitutes a part of the vehicle body. The insertion holes 10e are formed on a non-overlapping portion between the first left cover 10 and a second left cover 20 described below (see FIG. 7A). Also, the mounting holes 10a of this embodiment are formed in the vicinity of the insertion hole 10e which is a fastened portion to the vehicle body panel 5, and the clip K which is a fastened portion to the tower bar 6.

In addition, for example, the elastic bush 10b of this embodiment is preferably a rubber bush.

The first left cover 10 is fixed to a cowl top garnish 4 by inserting the insert 10d into a recess (not shown) formed on the cowl top garnish 4 which constitutes a part of the vehicle body (see FIGS. 1 and 2). Also, the first left cover 10 is fixed to the vehicle body panel 5 by inserting the clips K which are fastening members into the insertion hole 10e and a mounting hole (not shown) formed on the vehicle body panel 5 (see FIGS. 1 and 2). Further, the first left cover 10 is attached to the tower bar 6 by the clip K. In addition, the fastening member is the clip K in this embodiment, but is not limited thereto. For example, the fastening member may be a bolt or a screw.

Figure 10A:
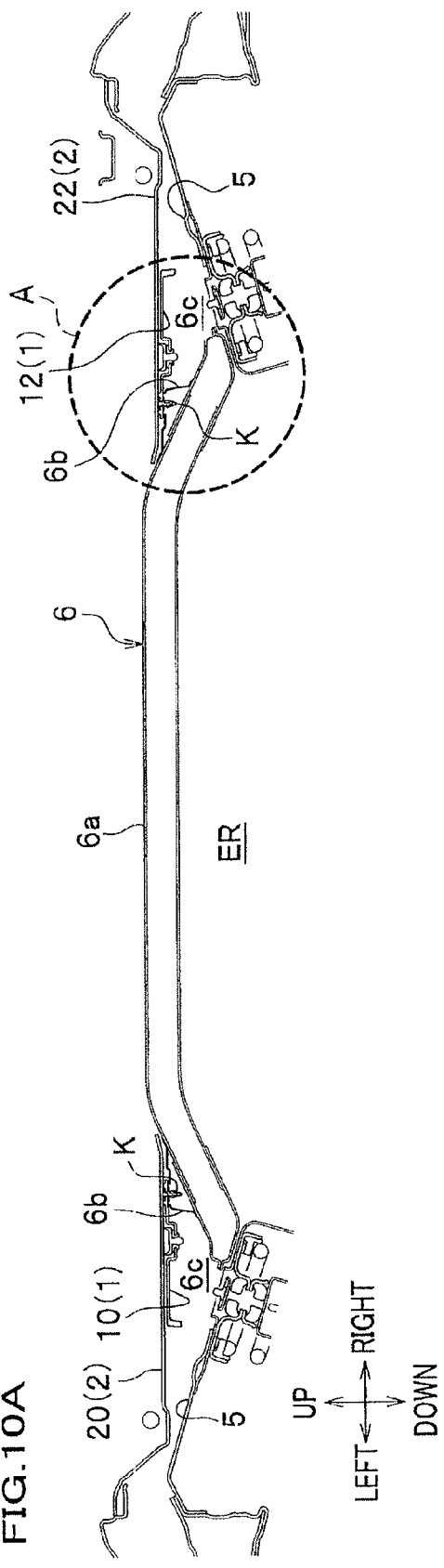
FIG. 10A is a sectional view taken along the line A-A of FIG. 1.
Figure 10B:
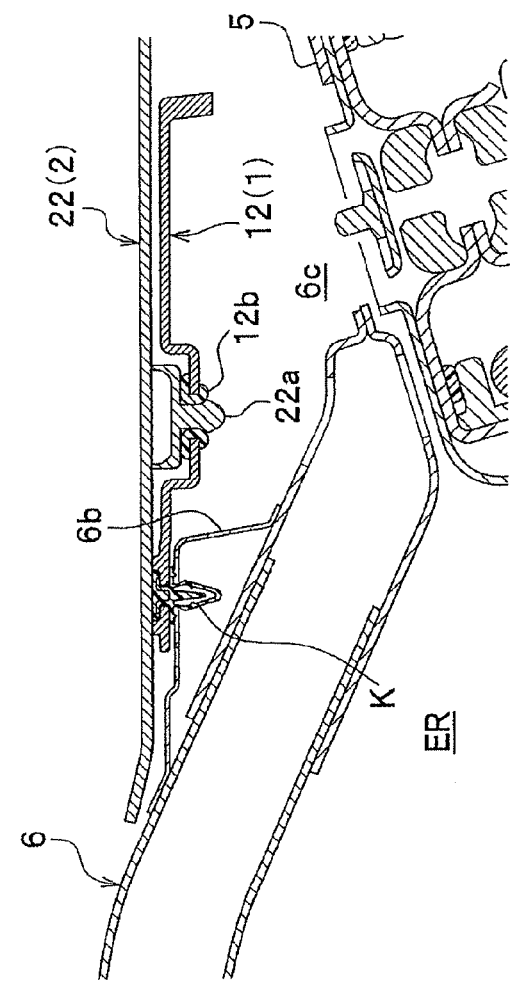
FIG. 10B is an enlarged view of a section A shown in FIG. 10A.

Here, referring to FIG. 10, an attaching structure for attaching the first cover 1 to the tower bar 6 will be explained in detail. In addition, FIG. 10A is a sectional view taken along the line A-A of FIG. 1, and FIG. 10B is an enlarged view of a section A shown in FIG. 10A.

As shown in FIGS. 1, 2, and 10, in the engine room ER, the vehicle body panels 5 extending in the front-rear direction on both sides of the vehicle, and the tower bar 6 extending in a direction orthogonal to the vehicle body panel 5 so as to span between the left and right vehicle body panels 5 are provided.

A top surface 6a of the tower bar 6 is disposed above an upper surface of the vehicle body panel 5. Also, as shown in FIG. 10A, support members 61) having L shaped cross section are attached at both ends of the tower bar 6. The support member 6b is disposed so that an upper surface of the support member 6b is parallel to the top surface 6a of the tower bar 6.

As shown in FIG. 10, the vehicle body panel 5 is angled downward toward an inner side of the engine room ER. Also, both ends of the tower bar 6 are angled downward toward the vehicle body panels 5. That is, in the vicinity of a connecting portion between the vehicle body panel 5 and the tower bar 6, a recess 6c which is lower than the top surface 6a of the tower bar 6 is formed.

The first cover 1 covers the recess 6c from above so that the upper surface of the first cover 1 is approximately coplanar with the top surface 6a of the tower bar 6. The first cover 1 is connected to the support member 6b by the clip K, and is fixed to the tower bar 6 via the support member 6b.

In addition, the first cover 1 of this embodiment is provided so that the upper surface of the first cover 1 is approximately coplanar with the top surface 6a of the tower bar 6, but may be coplanar with the top surface 6a of the tower bar 6.

Figure 5A:
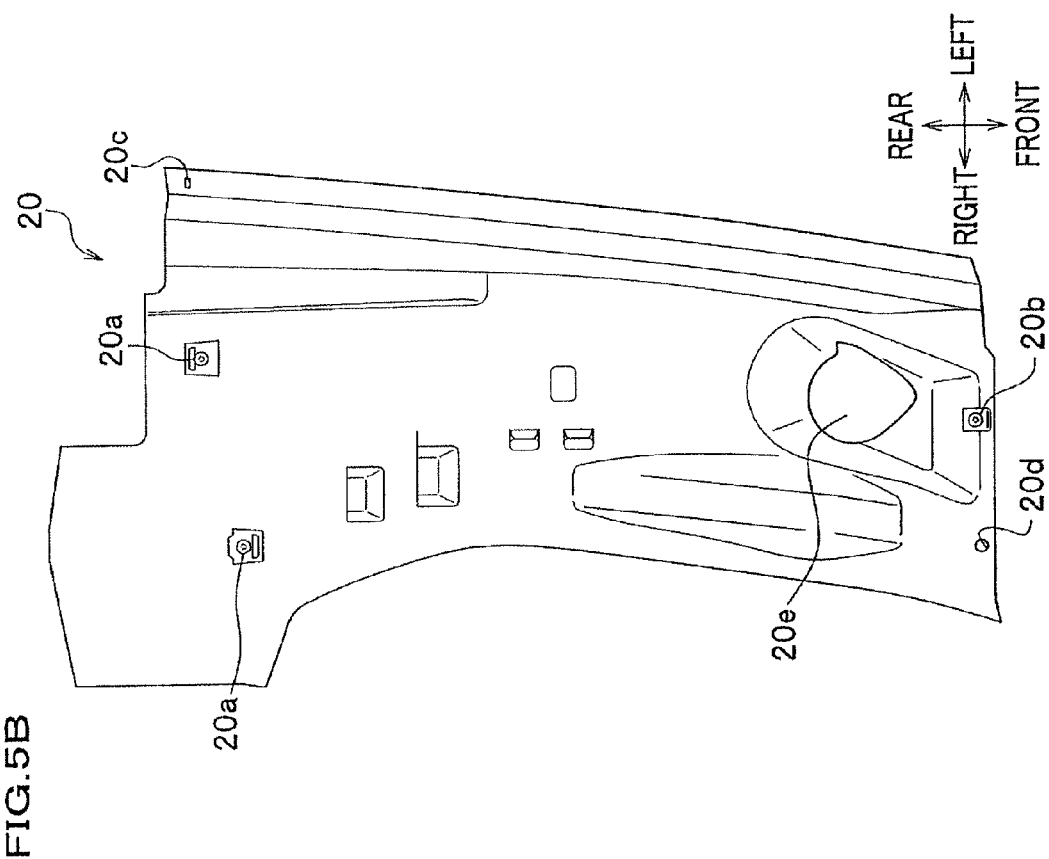
FIG. 5A is a plan view showing a structure of a second left cover according to this embodiment.
Figure 5B:
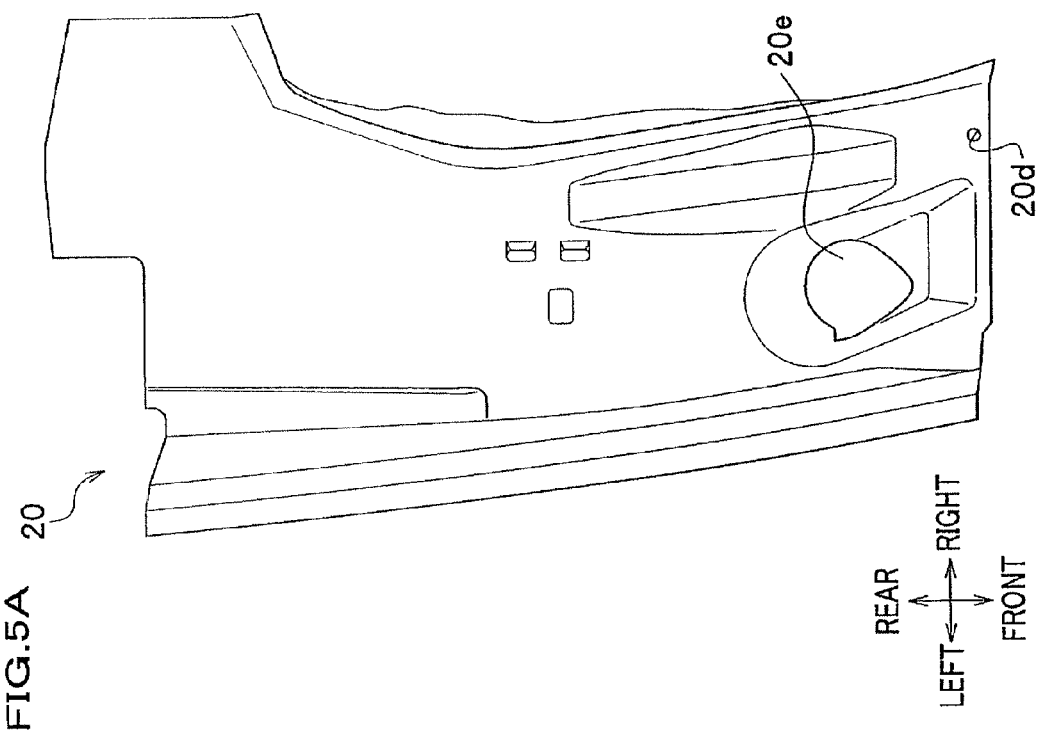
FIG. 5B is a bottom view showing a structure of the second left cover.
Figure 6B:
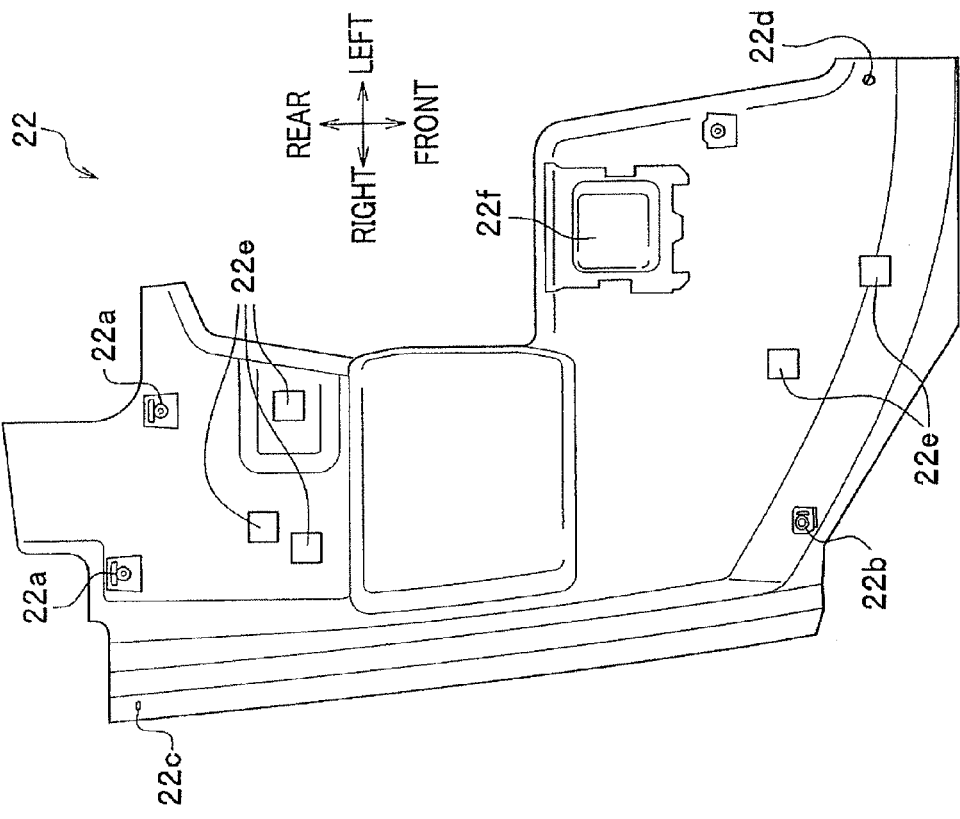
FIG. 6B is a bottom view showing a structure of the second right cover.
Figure 6A:
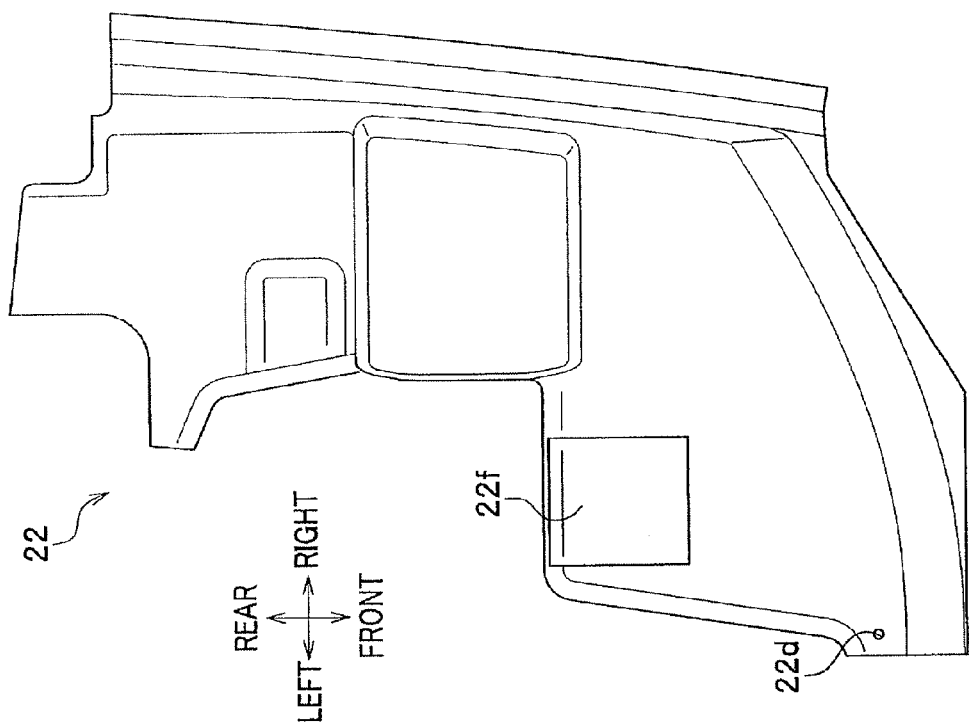
FIG. 6A is a plan view showing a structure of a second right cover according to this embodiment.
Figure 7C:
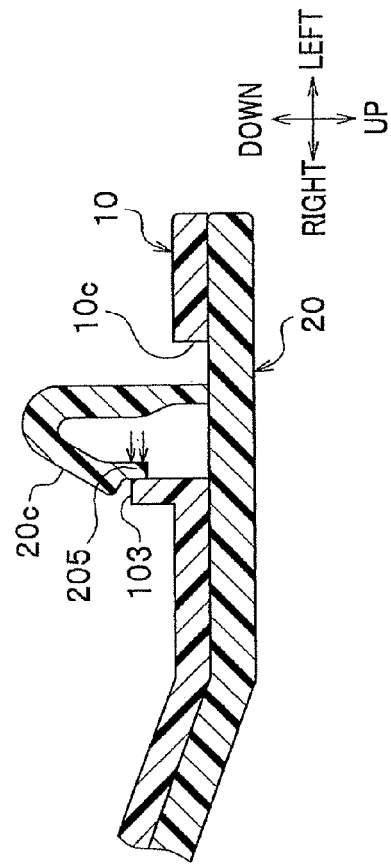
FIG. 7C is a sectional view taken along the line C-C of FIG. 7B.
Figure 7A:
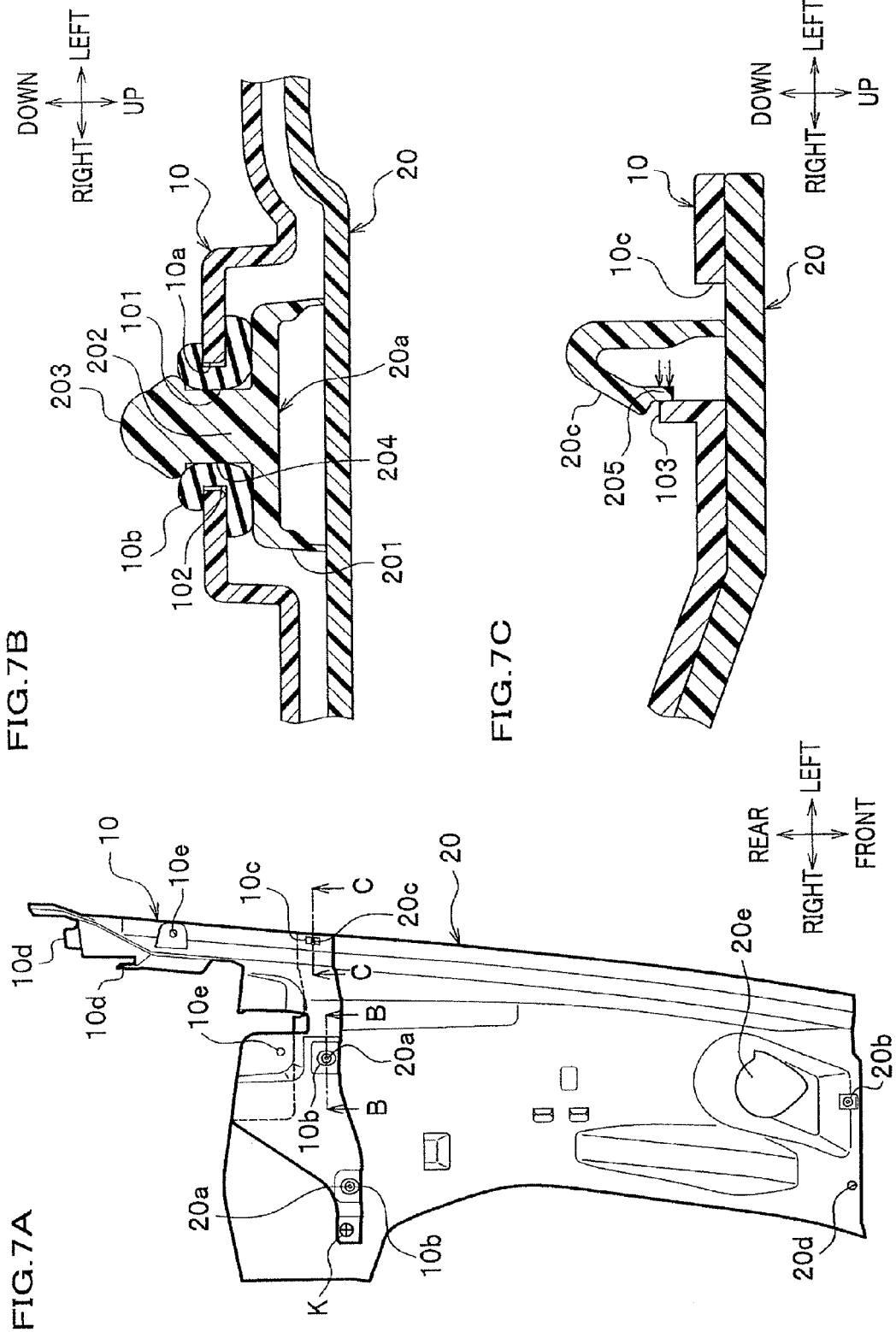
FIG. 7A is a bottom view showing an connection status between the first left cover and the second left cover.
Figure 8:
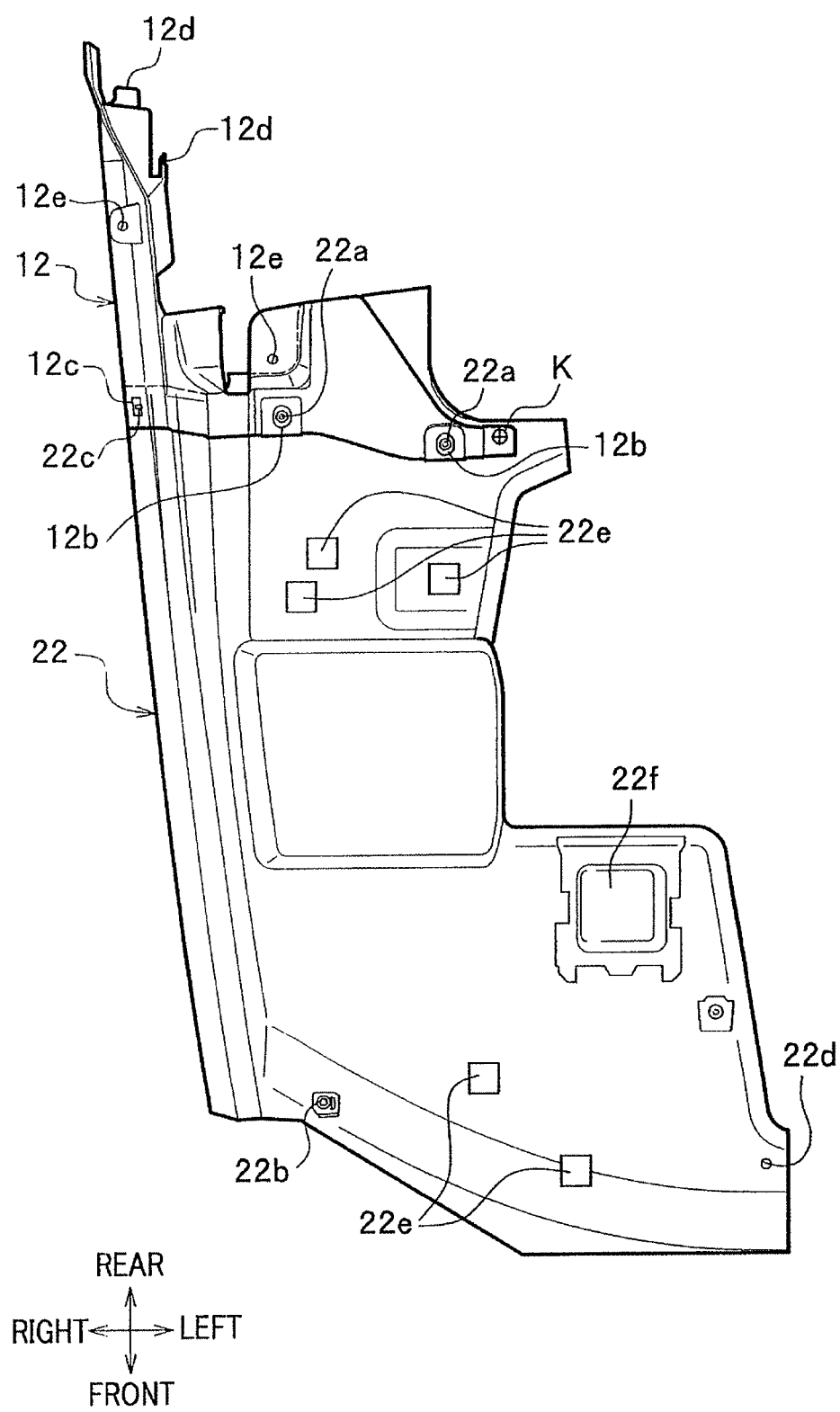
FIG. 8 is a bottom view showing a connection status between the first right cover and the second right cover.

Next, referring to FIGS. 5-8, a second cover 2 (i.e., a second cover body) will be explained in detail. In addition, FIG. 5A is a plan view showing a structure of a second left cover according to this embodiment, and FIG. 5B is a bottom view showing a structure of the second left cover. FIG. 6A is a plan view showing a structure of a second right cover according to this embodiment, and FIG. 6B is a bottom view showing a structure of the second right cover. FIG. 7A is a bottom view showing an connection status between the first left cover and the second left cover, FIG. 7B is a sectional view taken along the line B-B of FIG. 7A, and FIG. 7C is a sectional view taken along the line C-C of FIG. 7B. FIG. 8 is a bottom view showing a connection status between the first right cover and the second right cover.

As shown in FIG. 1, the second covers 2 are disposed at side portions of the engine E in a vehicle width direction so as to cover both of left and right sides of the engine room ER. The second covers 2 are disposed between the first cover 1 and a front grille cover 3 described below. That is, the second covers 2 are disposed so as to cover maintained members such as engine auxiliaries (e.g., a battery 60, an air cleaner 62, a light unit 64R, and a washer tank 66) and transmissions, etc. installed at a side portion of the engine E from above.

The second cover 2 includes a pair of left and right cover bodies, and is mainly constructed from the second left cover 20 and a second right cover 22. The second left cover 20 and the second right cover 22 are installed at opposite sides of the engine E.

As shown in FIG. 1, the second left cover 20 is disposed at left side of the engine room ER, covers the washer tank 66 from above, and is attached to the first left cover 10 and the front grille cover 3.

As shown in FIG. 5B, a plurality (e.g., three) of boss portions 20a, 20a, 20b are formed on a backside of the second left cover 20. For more detail, boss portions 20a, 20a inserted into the elastic bushes 10b of the first left cover 10 are formed at a rear end side (the first left cover 10 side) of the second left cover 20, and the boss portion 20b inserted into an elastic bush 31a (see FIG. 9) of the front grille cover 3 is formed at a front end side (the front grille cover 3 side).

Also, an engaging member 20c to engage the engaging hole 10c of the first left cover 10 is formed on a rear end side of the second left cover 20, and a clip insertion hole 20d is bored at a front end side so as to pass through in the direction of board thickness.

On an appropriate place of the second left cover 20, a through hole 20e is formed at a position corresponding to a cap 66a of the washer tank 66 in the direction of board thickness (see FIGS. 1 and 5).

The second left cover 20 is removably attached to the first left cover 10 and the front grille cover 3 by inserting the boss portion 20a into the elastic bush 10b of the first left cover 10 and inserting the boss portion 20b into the elastic bush 31a of the front grille cover 3 (see FIGS. 7A and 9B).

Here, referring to FIG. 7B, a connection structure between the elastic bush 10b and the boss portion 20a will be explained.

As shown in FIG. 7B, the boss portion 20a has a base 201 installed upright on a lower surface of the second left cover 20, an axis portion 202 having a circular lateral cross section which projects downward from the center portion of the base 201, and a head portion 203 having an approximately truncated cone longitudinal section which is continuously formed at the end of the axis portion 202.

A lower surface of the base 201 touches an upper surface of the elastic bush 10b, and an outer circumferential surface of the axis portion 202 tightly touches an inner circumferential surface of the elastic bush 10b. The head portion 203 is formed to taper, and an basal portion of the head portion 203 is formed to be larger than the axis portion 202 and the hole 101 of the elastic bush 10b. The basal portion of the head portion 203 touches a lower surface of the elastic bush 10b. In this manner, by forming the head portion 203 of the boss portion 20a to taper, the boss portion 20a becomes easy to be inserted into the elastic bush 10b. Also, by forming the basal portion of the head portion 203 to be larger than the hole 101 and to touch the elastic bush 10b, it is possible to prevent the boss portion 20a from coming off the elastic bush 10b owing to vibrations at the time of traveling.

Also, a groove portion 204 is formed between the base 201 and the head portion 203. The elastic bush 10b goes into the groove portion 204.

In addition, other boss portions and elastic bushes according to this embodiment have similar structures.

Next, referring to FIG. 7C, structures of the engaging hole 10c and the engaging member 20c will be explained in detail.

A supporting portion 103 is formed at the engaging hole 10c by a part of the inner circumferential surface of the engaging hole 10c projecting downward.

The coronoid engaging member 20c is formed by bending a sheet of an elastic member at one place. One end of the engaging member 20c is fixed to the lower surface of the second left cover 20, and a depressed portion 205 is formed at the other end. With the engaging member 20c is inserted into the engaging hole 10c, the depressed portion 205 touches the supporting portion 103 of the engaging hole 10c, and depresses the supporting portion 103 by the elasticity of the bended portion. That is, by the elasticity of the bended portion, the engaging member 20c engages the engaging hole 10c so as to connect the first left cover 10 to the second left cover 20.

In addition, an engaging hole 12c of the first right cover 12 and an engaging member 22c of the second right cover 22 according to this embodiment have similar structures.

As shown in FIG. 1, the second right cover 22 is disposed at right side of the engine room ER, covers the battery 60, the air cleaner 62, and the light unit 64R from above, and is attached to the first right cover 12 and the front grille cover 3.

As shown in FIG. 6B, a plurality (e.g., three) of boss portions 22a, 22a, 22b are formed on a backside of the second right cover 22. For more detail, boss portions 22a, 22a inserted into the elastic bushes 12b of the first right cover 12 are formed at a rear end side (the first right cover 12 side) of the second right cover 22, and the boss portion 22b inserted into an elastic bush 32a (see FIG. 9) of the front grille cover 3 is formed at a front end side (the front grille cover 3 side).

Also, an engaging member 22c to engage the engaging hole 12c of the first right cover 12 is formed on a rear end side of the second right cover 22, and a clip insertion hole 22d is bored at a front end side so as to pass through in the direction of board thickness.

At an appropriate place on a backside of the second right cover 22, a plurality of EPT members 22e, 22e, . . . to improve noise insulating properties are disposed. Also, on an appropriate place of the second right cover 22, a lid portion 22f for the battery is disposed at a position corresponding to a position of an positive terminal of the battery 60.

The second right cover 22 is removably attached to the first right cover 12 and the front grille cover 3 by inserting the boss portion 22a into the elastic bush 12b of the first right cover 10 and inserting the boss portion 22b into the elastic bush 32a of the front grille cover 3 (see FIGS. 8 and 9B).

Next, referring to FIG. 9, the front grille cover 3 which is one of the first cover bodies will be explained in detail. In addition, FIG. 9A is a plan view showing a structure of the front grille cover 3 according to this embodiment, and FIG. 9B is a bottom view showing a connection status between the front grille cover 3 and the second cover 2 according to this embodiment.

As shown in FIGS. 1 and 2, the front grille cover 3 extends in a left-right direction, is disposed ahead of the engine E, and covers a front side of the engine room ER. That is, the front grille cover 3 is attached to the vehicle body panel 5 so as to cover maintained members such as the light unit 64L and radiator 68, etc. from above. Also, the front grille cover 3 is disposed adjacent to a front grille 8 installed ahead of the front grille cover 3 (the engine room ER). An upper surface of the front grille cover 3 is approximately coplanar with an upper surface of the front grille 8. In addition, the upper surface of the front grille cover 3 of this embodiment may not be approximately coplanar with the upper surface of the front grille 8.

As shown in FIG. 9A, a plurality (e.g., two) of mounting holes 31, 32 are bored in the direction of board thickness at the rear end side of the front grille cover 3 (i.e., at the second cover 2 side), and elastic bushes 31a, 32a are fitted along opening lips of the mounting holes 31, 32.

Also, a plurality of outwardly projecting inserts 33, 33 are formed at both left and right ends of the front grille cover 3. At the rear end side of the front grille cover 3, clip insertion holes 34, 35 are bored in the direction of board thickness.

On an appropriate place of the front grille cover 3, a lid portion 36 for the radiator is disposed at a position corresponding to a cap (not shown) of the radiator 68.

In addition, for example, the elastic bushes 31a, 32a of this embodiment are preferably rubber bushes.

The front grille cover 3 is fixed to the vehicle body panel 5 by inserting the insert 33 into a recess (not shown) formed on the vehicle body panel 5 (see FIG. 1). Also, the front grille cover 3 is connected to the second left cover 20 by inserting the clips K into the clip insertion hole 34 and the clip insertion hole 20d of the second left cover 20 (see FIGS. 5 and 9B), and is connected to the second right cover 22 by inserting the clips K into the clip insertion hole 35 and the clip insertion hole 22d of the second right cover 22 (see FIGS. 6 and 9B). In addition, the front grille cover 3 may be connected to the second cover 2 using a means to insert the boss portion into the elastic bush without the clip K.

Next, referring to FIGS. 1-10, an example of steps for mounting the engine room cover EC to the vehicle body will be explained.

First, the elastic bushes 10b, 10b are fitted along the opening lips of the mounting holes 10a, 10a of the first left cover 10 respectively (see FIG. 3), and the elastic bushes 12b, 12b are fitted along the opening lips of the mounting holes 12a, 12a of the first right cover 12 respectively (see FIG. 4). Also, the elastic bushes 31a, 32a are fitted along the opening lips of the mounting holes 31, 32 of the front grille cover 3 respectively (see FIG. 9A).

Next, the boss portions 20a, 20a of the second left cover 20 are inserted into the elastic bushes 10b, 10b of the first left cover 10 respectively by covering the first left cover 10 with the second left cover 20 from above, and the second left cover 20 is attached to the first left cover 10 by engaging the engaging member 20c of the second left cover 20 in the engaging hole 10c of the first left cover 10 (see FIG. 7A).

Also, the boss portions 22a, 22a of the second right cover 22 are inserted into the elastic bushes 12b, 12b of the first right cover 12 respectively by covering the first right cover 12 with the second right cover 22 from above, and the second right cover 22 is attached to the first right cover 12 by engaging the engaging member 22c of the second right cover 22 in the engaging hole 12c of the first right cover 12 (see FIG. 8).

And, the boss portion 20b of the second left cover 20 is inserted into the elastic bush 31a of the front grille cover 3 by covering the front grille cover 3 with the second left cover 20 attached to the first left cover 10 from above, and the second left cover 20 is attached to the front grille cover 3 by inserting the clips K into the clip insertion hole 20d of the second left cover 20 and the clip insertion hole 34 of the front grille cover 3 (see FIG. 9B).

Also, the boss portion 22b of the second right cover 22 is inserted into the elastic bush 32a of the front grille cover 3 by covering the front grille cover 3 with the second right cover 22 attached to the first right cover 12 from above, and the second right cover 22 is attached to the front grille cover 3 by inserting the clips K into the clip insertion hole 22d of the second right cover 22 and the clip insertion hole 35 of the front grille cover 3 (see FIG. 9B).

Going through the above steps, the first left cover 10, the first right cover 12, the second left cover 20, the second right cover 22, and the front grille cover 3 are integrally connected one another. And, the first left cover 10, the first right cover 12, the second left cover 20, the second right cover 22, and the front grille cover 3 are installed in the engine room ER in integrally connected condition.

More specifically, the rear end side of the first left cover 10 is attached to the cowl top garnish 4 by inserting the inserts 10d, 10d of the first left cover 10 into recesses (not shown) formed on the cowl top garnish 4 (see FIG. 1). Also, the first left cover 10 is attached to the vehicle body panel 5 by inserting the clips K into the insertion holes 10e, 10e of the first left cover 10 and mounting holes (not shown) formed on the vehicle body panel 5 (see FIG. 1).

Also, the rear end side of the first right cover 12 is attached to the cowl top garnish 4 by inserting inserts 12d, 12d of the first right cover 12 into recesses (not shown) formed on the cowl top garnish 4 (see FIG. 1). Also, the first right cover 12 is attached to the vehicle body panel 5 by inserting the clips K into insertion holes 12e, 12e of the first right cover 12 and mounting holes (not shown) formed on the vehicle body panel 5 (see FIG. 1).

Further, both left and right ends of the front grille cover 3 are attached to the vehicle body panel 5 by inserting inserts 33, 33 of the front grille cover 3 into recesses (not shown) of the vehicle body panel 5 (see FIG. 1).

Going through the above steps, the engine room cover EC of this embodiment is mounted to the vehicle body, and is disposed in the engine room ER. The mounted engine room cover EC can be mounted in the engine room ER easily in a short time in one working operation.

In addition, the first cover 1, the second cover 2, and the front grille cover 3 may be mounted in the engine room separately. For example, the front grille cover 3 may be attached to the vehicle body panel 5 in advance. Next, the second left cover 20 is attached to the first left cover 10, and the connected first left cover 10 and second left cover 20 is attached to the front grille cover 3, the cowl top garnish 4, and the vehicle body panel 5. Also, the second right cover 22 is attached to the first right cover 12, and the connected first right cover 12 and second right cover 22 may be attached to the front grille cover 3, the cowl top garnish 4, and the vehicle body panel 5. In this manner, the first cover 1 and the second cover 2 can be mounted in the engine room ER easily in a short time.

Next, referring to FIGS. 1-10, an example of steps for removing the engine room cover EC at the time of maintenance will be explained.

First, the clips K are pulled out from the clip insertion hole 22d of the second right cover 22 and the clip insertion hole 35 of the front grille cover 3 (see FIG. 9B).

Next, the boss portions 22a, 22a of the second right cover 22 are pulled out from the elastic bushes 12b, 12b of the first right cover 12 respectively by lifting up the second right cover 22, and the second right cover 22 is removed from the first right cover 12 by pulling out the engaging member 22c of the second right cover 22 from the engaging hole 12c of the first right cover 12 (see FIG. 8).

Also, the second right cover 22 is removed from the first right cover 12, and at the same time, the second right cover 22 is removed from the front grille cover 3 by pulling out the boss portion 22b of the second right cover 22 from the elastic bush 32a of the front grille cover 3 (see FIG. 9B).

Further, in like manner, the second left cover 20 is removed from the first left cover 10 and the front grille cover 3.

Going through the above steps, as shown in FIG. 2, the maintenance of parts can be performed because the second cover 2 is removed so as to expose parts such as the battery 60, etc.

As described above, according to the engine room cover EC of this embodiment, by providing the mounting holes 10a (12a, 31, 32) and the elastic bushes 10b (12b, 31a, 32a) fitted along the opening lips of the mounting holes 10a (12a, 31, 32) on the first cover 1 and the front grille cover 3, and providing the boss portions 20a (20b, 22a, 22b) inserted into the elastic bushes 10b (12b, 31a, 32a) on the second cover 2, maintenance of the battery 60, etc. can be performed easily because the mounting/removing operation of the second cover 2 to/from the first cover 1 and the front grille cover 3 becomes easy.

Also, by providing the elastic bushes 10b (12b, 31a, 32a) on the first cover 1 and the front grille cover 3, if the elastic bushes 10b (12b, 31a, 32a) are provided on the first cover 1 and the front grille cover 3 before the first cover 1 is attached to the cowl top garnish 4, the vehicle body panel 5, and the tower bar 6, and before the front grille cover 3 is attached to the vehicle body panel 5, the working efficiency of elastic bushes 10b (12b, 31a, 32a) fitting operation increases because the peripheral parts of the engine E and the engine hood (not shown), etc. do not obstruct fitting operation of the elastic bushes 10b (12b, 31a, 32a).

That is, according to this embodiment, both of the maintainability and the workability of fitting operation of the elastic bushes 10b (12b, 31a, 32a) can be improved.

Also, by fixing the first cover 1 to the vehicle body panel 5 with the clip K, the displacement of the first cover 1 relative to the vehicle body panel 5 can be prevented because the first cover 1 is firmly fixed to the vehicle body panel 5.

Also, because the mounting hole 10a (12a) of the first cover 1 is formed in the vicinity of the insertion hole 10e (12e) which is a fastened portion between the first cover 1 and the vehicle body panel 5, and the clip K which is a fastened portion between the first cover 1 and the tower bar 6, the stiffness of the first cover 1 with respect to the insertion load (mounting load) occurred at the time of inserting the boss portion 20a (22a) of the second cover 2 into the elastic bush 10b (12b) of the first cover 1 increases. As a result, because the flexure of the first cover 1 can be suppressed at the time of mounting the second cover 2, it becomes easy to insert the boss portion 20a (22a) into the elastic bush 10b (12b), and the working efficiency of attaching the second cover 2 to the first cover 1 increases.

Also, because the insertion hole 10e (12e) into which the clip K is inserted so as to connect the first cover 1 to the vehicle body panel 5 are formed on the non-overlapping portion between the first cover 1 and the second cover 2, the first cover 1 connected to the second cover 2 is attached to the cowl top garnish 4, the vehicle body panel 5, and the tower bar 6, and the working efficiency of attaching the first cover 1 connected to the second cover 2 to the cowl top garnish 4, the vehicle body panel 5, and the tower bar 6 further increases.

Also, because the first cover 1 is attached to the tower bar 6 so that the upper surface of the first cover 1 is coplanar (or approximately coplanar) with the top surface 6a of the tower bar 6, the continuity between the first cover 1 and the tower bar 6 can be kept, and the appearance of the engine room ER at the time of mounting the engine room cover EC can be further improved.

Also, because the concave portion does not need to be formed owing to directly attaching the first cover 1 to tower bar 6, the configuration of the first cover 1 can be simplified compared to the case where the first cover 1 is attached to the vehicle body panel 5 while keeping the continuity between the first cover 1 and the tower bar 6, and the working efficiency of attaching the first cover 1 increases.

Also, the front grille cover 3 is disposed adjacent to the front grille 8, and the upper surface of the front grille cover 3 becomes coplanar (or approximately coplanar) with the upper surface of the front grille 8. As a result, the gap in the parting line formed at the boundary portion between the front grille 8 and the front grille cover 3, which gap is easy to be observed from front of the vehicle, disappears when the openable engine hood which covers the engine room ER is opened, and the appearance can be improved.

Also, the second cover 2 is disposed at the side portion of the engine E in the vehicle width direction. Because the side portion of the engine E in the vehicle width direction is not easy to be observed from in front of the vehicle when the engine hood is opened, a certain gap in the parting line can be allowed.

Further, the engine E is the transversal engine. Because the maintenance of the engine auxiliaries and the transmission, etc. installed on the side of the engine E in the vehicle width direction can be easily performed by only removing the second cover 2 from the first cover 1 and the front grille cover 3, the maintainability of the engine auxiliaries and the transmission, etc. can be improved.

While one embodiment of the present invention has been described, variations may be made without departing from the spirit of the present invention.

Figure 11:
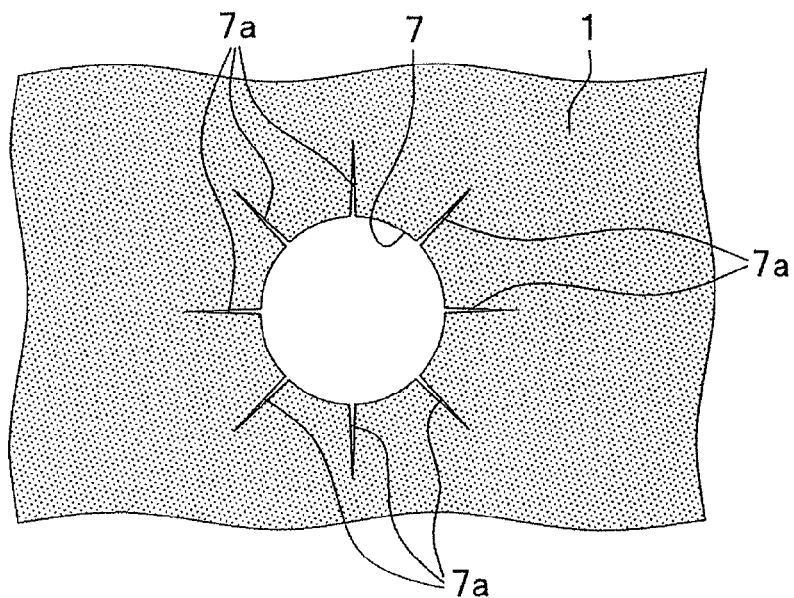
FIG. 11 is an enlarged view showing a structure of a mounting hole according to a modified embodiment.
Figure 12A:
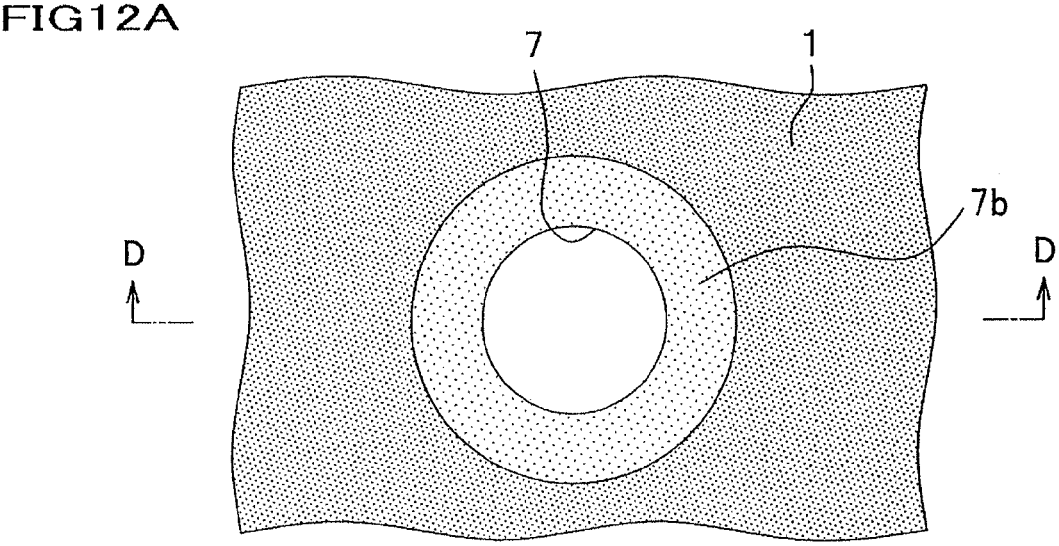
FIG. 12A is an enlarged view showing a structure of a mounting hole according to the modified embodiment.
Figure 12B:
FIG. 12B is a sectional view taken along the line D-D of FIG. 12A.
Figure 12C:
FIG. 12C is a longitudinal sectional view showing a structure of the mounting hole according to the modified embodiment.

The elastic bush is fitted along the opening lip of the mounting hole in this embodiment. However, as shown in FIGS. 11 and 12, a mounting hole 7 whose opening lip is flexible may be provided instead of the elastic bush. In addition, FIG. 11 is an enlarged view showing a structure of a mounting hole according to a modified embodiment, FIG. 12A is an enlarged view showing a structure of a mounting hole according to the modified embodiment, and FIG. 12B is a sectional view taken along the line D-D of FIG. 12A. Also, FIG. 12C is a longitudinal sectional view of other modified embodiment. Also, the first cover 1 of the modified embodiment is made of resinous material.

As shown in FIG. 11, a plurality of cut portions 7a, 7a, . . . are formed along an opening lip of the mounting hole 7 according to the modified embodiment. The cut portions 7a are radially formed at equal intervals. In addition, because the first cover 1 of the modified embodiment is made of resinous material, it is easy to form the mounting hole 7 when the resinous material is molded.

Also, as shown in FIGS. 12A and 12B, a thin portion 7b having a predetermined width is formed along an opening lip of the mounting hole 7 according to a modified embodiment. The thin portion 7b is formed by scratching the opening lip of the mounting hole 7 until the thickness of the thin portion 7b becomes about half of that of the first cover 1. In addition, as shown in FIG. 12C, the thin portion 7b may be formed by tapering the mounting hole 7 radially-inwardly from the upper surface toward the lower surface of the first cover 1. Also, the front grille cover 3 may has the similar configuration.

In this manner, by providing the mounting holes 7 whose opening lips are flexible on the first cover 1 and the front grille cover 3, the effect similar to that of this embodiment can be achieved.

Also, by providing the mounting holes 7 whose opening lip are flexible on the first cover 1 and the front grille cover 3, the operation for attaching the elastic bush to the first cover 1 and the front grille cover 3 can be omitted.

Further, because the elastic bush does not need to be fitted along the opening lip of the mounting hole 7, the number of parts is reduced, the mounting/removing operation of the second cover 2 to/from the first cover 1 and the front grille cover 3 becomes easy, and the maintenance of the battery 60, etc. can be performed easily.

What is claimed is:

1. An engine room cover comprising:
    a first cover body installed in an engine room formed in a vehicle body, said engine room being defined, in part, by a vehicle hood, said first cover body being fixed to the vehicle body with a fastening member and being disposed beneath said hood; and
    a second cover body removably attached to the first cover body and covering a maintained member installed in the engine room,
    wherein the first cover body has a mounting hole bored in a direction of board thickness and an elastic bush fitted along an opening lip of the mounting hole, the second cover body has a boss portion inserted into the elastic bush, the first cover body is integrally connected to the second cover body, and the integrally connected first and second cover bodies are mounted to the vehicle.

2. The engine room cover according to claim 1, wherein the mounting hole is formed in the vicinity of a fastened portion between the first cover body and the vehicle body.

3. The engine room cover according to claim 1, wherein the first cover body has an overlapping portion with the second cover body and a non-overlapping portion with the second cover body, and
    insertion holes into which the fastening members are inserted are formed on the non-overlapping portion with the second cover body.

4. The engine room cover according to claim 1, wherein a front grille is installed ahead of the engine room, and
    the first cover body includes a front grille cover disposed adjacent to the front grille ahead of the engine installed in the engine room.

5. The engine room cover according to claim 4, wherein the second cover body is disposed at a side portion of the engine in a vehicle width direction.

6. The engine room cover according to claim 5, wherein the engine is a transversal engine.

7. An engine room cover comprising:
    a resinous first cover body installed in an engine room formed in a vehicle body, said engine room being defined, in part, by a vehicle hood, said first cover body being fixed to the vehicle body with a fastening member and being disposed beneath said hood; and
    a second cover body removably attached to the first cover body and covering a maintained member installed in the engine room,
    wherein the first cover body has a mounting hole bored in a direction of board thickness and whose opening lip is flexible, the second cover body has a boss portion inserted into the mounting hole, the first cover body is integrally connected to the second cover body, and the integrally connected first and second cover bodies are mounted to the vehicle.

8. The engine room cover according to claim 7, wherein the mounting hole is formed in the vicinity of a fastened portion between the first cover body and the vehicle body.

9. The engine room cover according to claim 7, wherein the first cover body has an overlapping portion with the second cover body and a non-overlapping portion with the second cover body, and
    insertion holes into which the fastening members are inserted are formed on the non-overlapping portion with the second cover body.

10. The engine room cover according to claim 7, wherein a front grille is installed ahead of the engine room, and
    the first cover body includes a front grille cover disposed adjacent to the front grille ahead of the engine installed in the engine room.

11. The engine room cover according to claim 10, wherein the second cover body is disposed at a side portion of the engine in a vehicle width direction.

12. The engine room cover according to claim 11, wherein the engine is a transversal engine.

13. An engine room cover, comprising:
    a first cover body installed in an engine room formed in a vehicle body, and fixed to the vehicle body with a fastening member; and
    a second cover body removably attached to the first cover body and covering a maintained member installed in the engine room;
    wherein the first cover body has a mounting hole bored in a direction of board thickness and an elastic bush fitted along an opening lip of the mounting hole, the second cover body has a boss portion inserted into the elastic bush, vehicle body panels extending in a front-rear direction on both sides of the vehicle, and a tower bar extending in a direction orthogonal to the vehicle body panel so as to span between the vehicle body panels are provided in the engine room, an upper surface of the tower bar is disposed above an upper surface of the vehicle body panel, and the first cover body is attached to the tower bar so that an upper surface of the first cover body is coplanar or approximately coplanar with the upper surface of the tower bar.

14. The engine room cover according to claim 13, wherein the mounting hole is formed in the vicinity of a fastened portion between the first cover body and the vehicle body.

15. The engine room cover according to claim 13, wherein the first cover body has an overlapping portion with the second cover body and a non-overlapping portion with the second cover body, and insertion holes into which the fastening members are inserted are formed on the non-overlapping portion with the second cover body.

16. The engine room cover according to claim 13, wherein a front grille is installed ahead of the engine room, and the first cover body includes a front grille cover disposed adjacent to the front grille ahead of the engine installed in the engine room.

17. The engine room cover according to claim 16, wherein the second cover body is disposed at a side portion of the engine in a vehicle width direction.

18. The engine room cover according to claim 17, wherein the engine is a transversal engine.

19. An engine room cover, comprising:
    a resinous first cover body installed in an engine room formed in a vehicle body, and fixed to the vehicle body with a fastening member; and
    a second cover body removably attached to the first cover body and covering a maintained member installed in the engine room;

wherein the first cover body has a mounting hole bored in a direction of board thickness and whose opening lip is flexible, the second cover body has a boss portion inserted into the mounting hole, vehicle body panels extending in a front-rear direction on both sides of the vehicle, and a tower bar extending in a direction orthogonal to the vehicle body panel so as to span between the vehicle body panels are provided in the engine room, an upper surface of the tower bar is disposed above an upper surface of the vehicle body panel, and the first cover body is attached to the tower bar so that an upper surface of the first cover body is coplanar or approximately coplanar with the upper surface of the tower bar.

20. The engine room cover according to claim 19, wherein the mounting hole is formed in the vicinity of a fastened portion between the first cover body and the vehicle body.

21. The engine room cover according to claim 19, wherein the first cover body has an overlapping portion with the second cover body and a non-overlapping portion with the second cover body, and insertion holes into which the fastening members are inserted are formed on the non-overlapping portion with the second cover body.

22. The engine room cover according to claim 19, wherein a front grille is installed ahead of the engine room, and the first cover body includes a front grille cover disposed adjacent to the front grille ahead of the engine installed in the engine room.

23. The engine room cover according to claim 22, wherein the second cover body is disposed at a side portion of the engine in a vehicle width direction.

24. The engine room cover according to claim 23, wherein the engine is a transversal engine.

* * * * *